(12) United States Patent
Greene et al.

(10) Patent No.: US 12,490,688 B2
(45) Date of Patent: Dec. 9, 2025

(54) CONCENTRATOR ATTACHMENT FOR BLOWER AIR TUBE

(71) Applicant: BLACK & DECKER INC., New Britain, CT (US)

(72) Inventors: Nathan Greene, Baltimore, MD (US); Khoa Nguyen, Owings Mills, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 18/626,868

(22) Filed: Apr. 4, 2024

(65) Prior Publication Data
US 2024/0245014 A1    Jul. 25, 2024

Related U.S. Application Data

(63) Continuation of application No. 17/987,162, filed on Nov. 15, 2022, now Pat. No. 11,950,543, which is a continuation of application No. 16/200,017, filed on Nov. 26, 2018, now Pat. No. 11,523,569.

(51) Int. Cl.
| | |
|---|---|
| *A01G 20/47* | (2018.01) |
| *A47L 5/14* | (2006.01) |
| *A47L 9/08* | (2006.01) |
| *B05B 1/34* | (2006.01) |
| *F04D 29/54* | (2006.01) |

(52) U.S. Cl.
CPC ............ *A01G 20/47* (2018.02); *B05B 1/3402* (2018.08); *F04D 29/542* (2013.01); *A47L 5/14* (2013.01); *A47L 9/08* (2013.01); *F05B 2240/123* (2013.01)

(58) Field of Classification Search
CPC .. A01G 20/47; A47L 5/14; A47L 9/08; B05B 1/3402; E01H 1/0809; F04D 29/542; F05B 2240/123
See application file for complete search history.

(56) References Cited

U.S. PATENT DOCUMENTS

| | | | | |
|---|---|---|---|---|
| 4,884,314 A | * | 12/1989 | Miner ................... | A01G 20/47 15/419 |
| 5,473,824 A | * | 12/1995 | Prehodka ............. | A45D 20/124 392/367 |
| 5,555,637 A | * | 9/1996 | Montagnino .......... | A45D 20/10 392/374 |
| 5,626,156 A | * | 5/1997 | Vicory, Sr. ............... | A45D 2/38 132/229 |
| 5,950,276 A | * | 9/1999 | Everts ................... | A01G 20/47 15/418 |

(Continued)

FOREIGN PATENT DOCUMENTS

WO    WO-2019063517 A1 *    4/2019   ............. A01G 20/47

*Primary Examiner* — Marc Carlson
(74) *Attorney, Agent, or Firm* — Mannava & Kang, P.C.

(57) ABSTRACT

A concentrator nozzle attachment for a blower device is disclosed that increases the airflow velocity of the blower without sacrificing the field of the jetting air. The concentrator nozzle is formed of an outer ring with a centrally located guide surface and is placed at the exit of an air tube. As the air exits the air tube, it's forced to flow around the guide surface, thus increasing its velocity. The attachment is secured to the end of the air tube and so does not alter the outer diameter through which the air exits. In this way, air velocity is increased without reducing its effectiveness.

10 Claims, 7 Drawing Sheets

(56) References Cited

U.S. PATENT DOCUMENTS

| | | | | |
|---|---|---|---|---|
| 6,003,199 | A * | 12/1999 | Shaffer | A01G 20/47 15/415.1 |
| 8,789,237 | B2 * | 7/2014 | Hatano | E01H 1/0809 15/405 |
| 9,603,497 | B2 * | 3/2017 | Yamaoka | A01G 20/47 |
| 9,883,726 | B2 * | 2/2018 | Hsu | A45D 20/12 |
| 10,670,048 | B2 * | 6/2020 | Landén | A01G 20/47 |
| 11,523,569 | B2 * | 12/2022 | Greene | A01G 20/47 |
| 2009/0038108 | A1 * | 2/2009 | Shaanan | A47L 5/14 15/246 |
| 2011/0162225 | A1 * | 7/2011 | Obermann | F24H 9/0063 34/97 |
| 2015/0233378 | A1 * | 8/2015 | Svoboda | A47L 5/14 239/589 |
| 2015/0366424 | A1 * | 12/2015 | Naka | E01H 1/0809 239/590.5 |
| 2016/0029863 | A1 * | 2/2016 | Guo | A47L 9/08 15/415.1 |
| 2016/0298635 | A1 * | 10/2016 | Su | F04D 29/325 |
| 2017/0260985 | A1 * | 9/2017 | Gao | F04D 25/084 |
| 2018/0228326 | A1 * | 8/2018 | Crichton | A47L 5/14 |
| 2020/0163289 | A1 * | 5/2020 | Greene | F04D 29/542 |

* cited by examiner

CONCENTRATOR ATTACHMENT FOR BLOWER AIR TUBE

CROSS REFERENCE TO RELATED APPLICATIONS

The present application is a continuation of U.S. patent application Ser. No. 17/987,162, filed Nov. 15, 2022, entitled "Concentrator Attachment For Blower Air Tube", which is a continuation of U.S. Pat. No. 11,523,569, issued Dec. 13, 2022, entitled "Concentrator Attachment For Blower Air Tube", the entirety of which is herein incorporated by reference in its entirety.

FIELD OF THE INVENTION

The present invention is directed to outdoor blowers having an air tube with a concentrator to increase the air flow velocity.

BACKGROUND OF THE INVENTION

Outdoor blower devices are used to clean patios, sidewalks and other areas by blowing away leaves and other debris. Currently known blowers can be axial-type or centrifugal-type, and can be powered by a variety of sources including DC electric power, AC electric power or petroleum based fuels. To satisfy the requirements of the user, the blower must generate a sufficiently large quantity of air, having sufficient velocity. In some cases, air quantity is preferred over air velocity, and thus the user should be able to dictate this on the blower apparatus.

Figure 1:
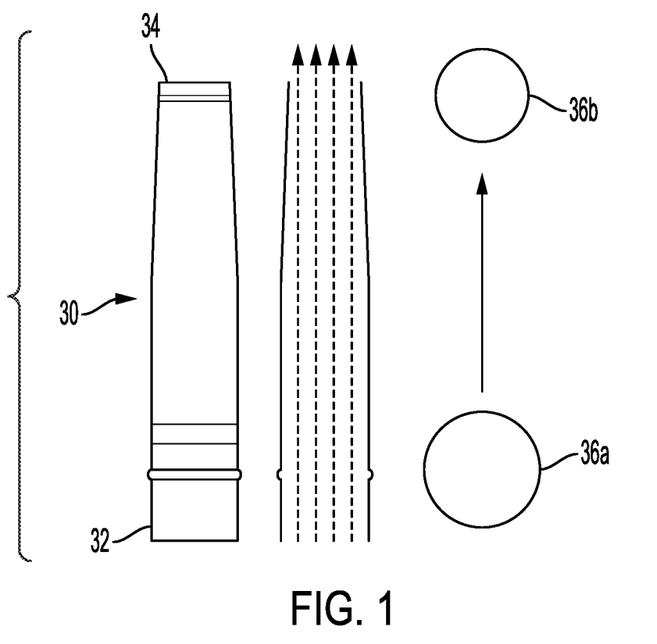
FIG. 1 shows the airflow through a typical tapered air tube.

Concentrator nozzles are well known and used to adjust the performance of the blower apparatus. FIG. 1 shows a typical air tube 30 for a blower having a concentrator feature built in. In this embodiment, the air tube's cross-sectional area is gradually reduced from its proximal end 32 to its distal end 34, as shown by the circles 36a and 36b, respectively. The cross-sectional area is reduced by reducing the diameter of the air tube which defines the field of the jetting air or its area-of-effect (AoE). The reduction in diameter and cross-sectional area increases the air velocity, but comes at a cost of reducing the air quantity and the AoE and so diminishes the effectiveness of the blower.

BRIEF SUMMARY OF THE INVENTION

Therefore, the present invention provides a concentrator nozzle that increases the airflow velocity without sacrificing its AoE. The concentrator nozzle is formed of an outer ring with a centrally located guide surface. The concentrator is placed at the exit of an air tube, where the guide surface blocks a central portion of the airflow. The outer diameter of the air tube is not changed, and in this way, air velocity is increased without affecting the AoE. In a preferred embodiment, the concentrator nozzle is shown as a separate attachment allowing the user to use it on existing air tubes.

BRIEF DESCRIPTION OF THE INVENTION

Further features and advantages of the present invention will be better understood by reference to the following description, which is given by way of example and in association with the accompanying drawings, in which.

DETAILED DESCRIPTION OF THE INVENTION

Figure 3:
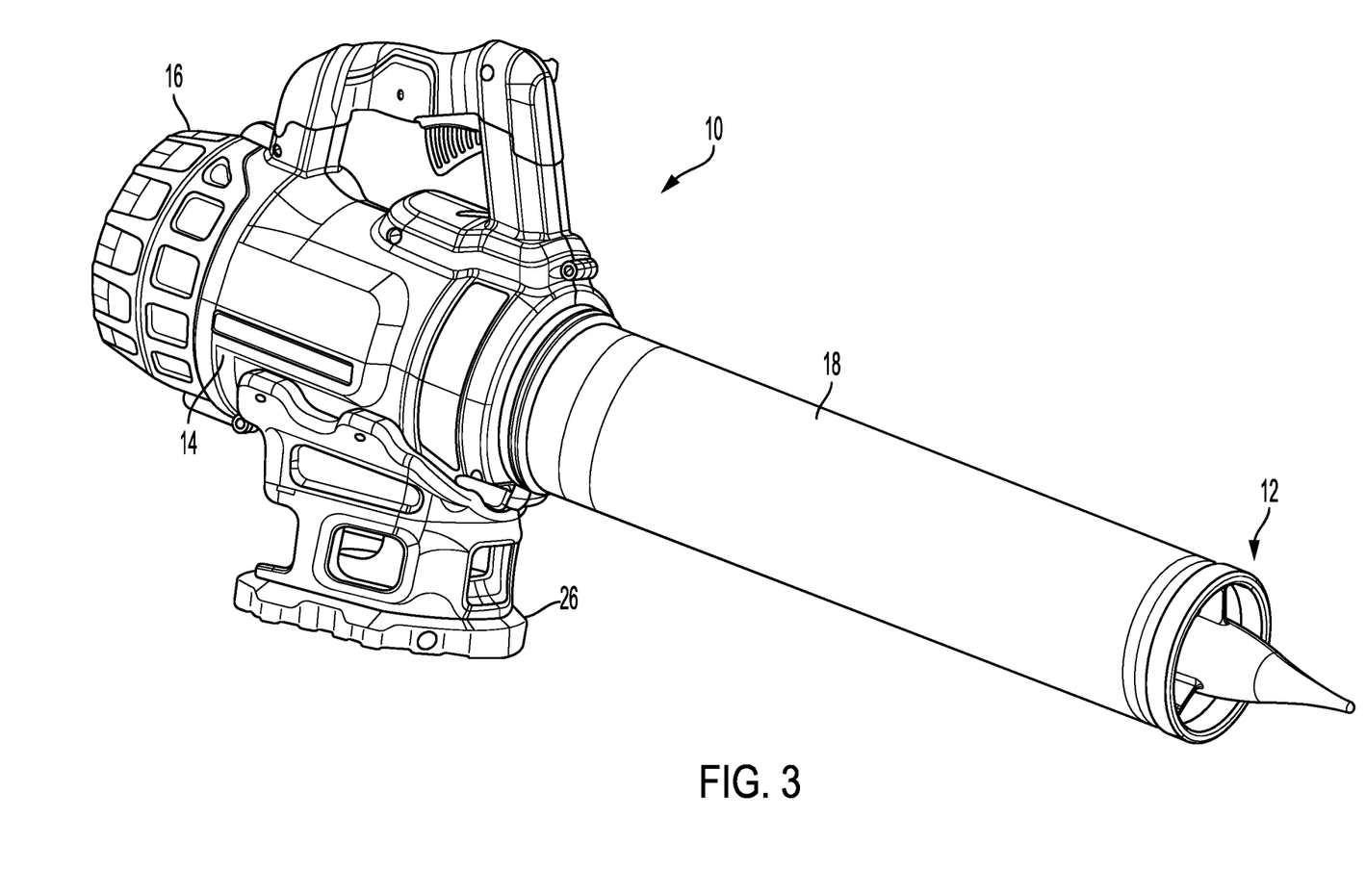
FIG. 3 is a blower with the concentrator attachment of the present invention.
Figure 4:
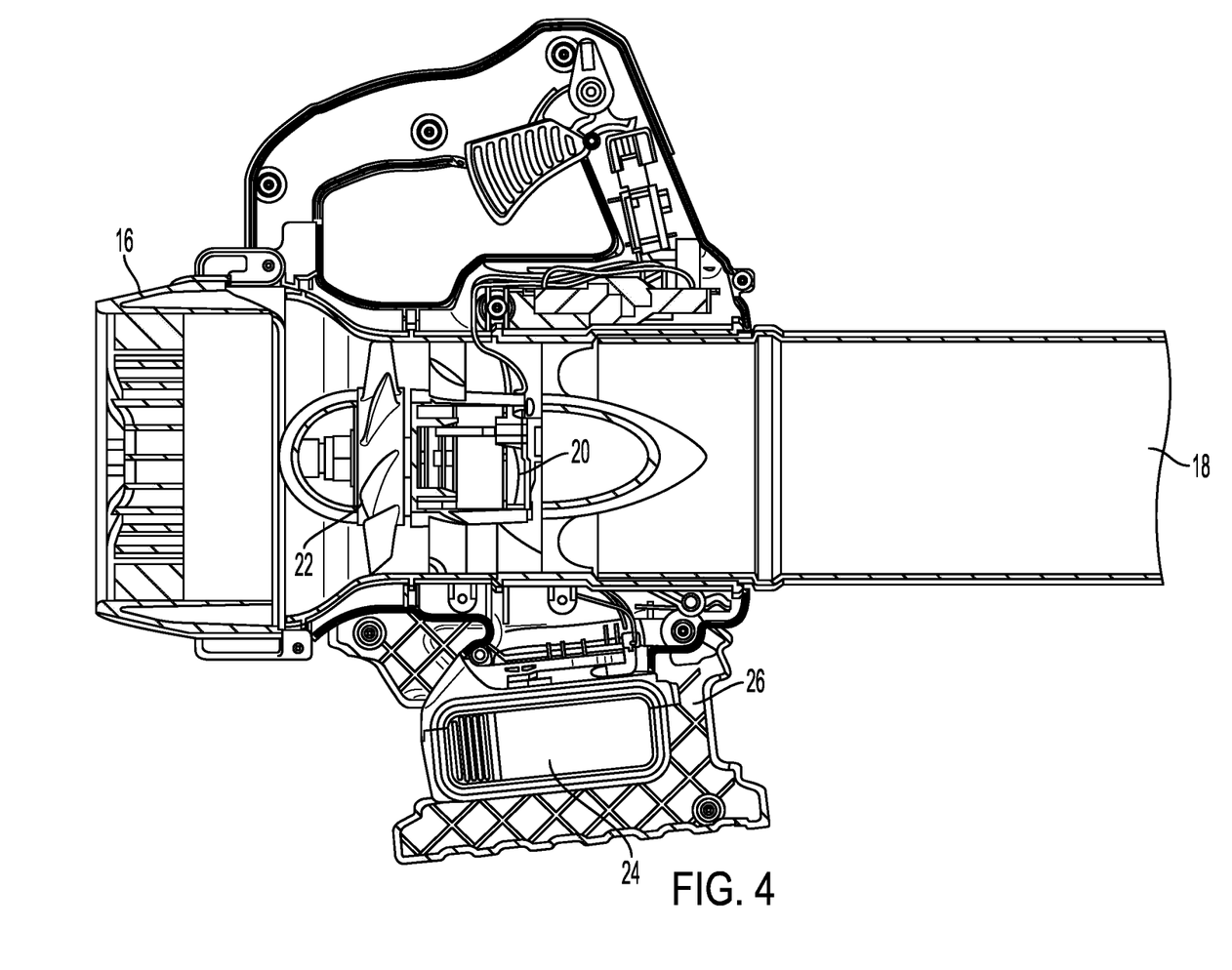
FIG. 4 is a side sectional view of the motor housing.

Referring to FIG. 3, a blower 10 incorporating a concentrator attachment 12 of the present invention is shown. The blower is an axial type blower with a main housing 14 having a rear air inlet 16 and an air tube 18. The concentrator attachment 12 is secured at an outlet of the air tube 18. A motor 20 and fan 22 (see FIG. 4) are positioned in the main housing 14, with the motor being powered by a battery 24. The battery 24 is secured to a bottom portion of the main housing 14 within a battery housing 26. The battery housing 26 surrounds the battery 24 and protects it from damage during falls or other mishaps. Additionally, the battery housing 26 is used to support the blower 10 when it's placed on the ground or other surface.

Although a battery 24 is shown, any other power source, such as AC power or gasoline, can be used to provide energy to the motor and still fall within the scope of the invention.

The air tube 18 is connected to the housing 14 at a first end, using ribbed walls or other well known connection means. The air tube 18 maintains a constant cross-sectional area along its longitudinal length.

Figure 5:
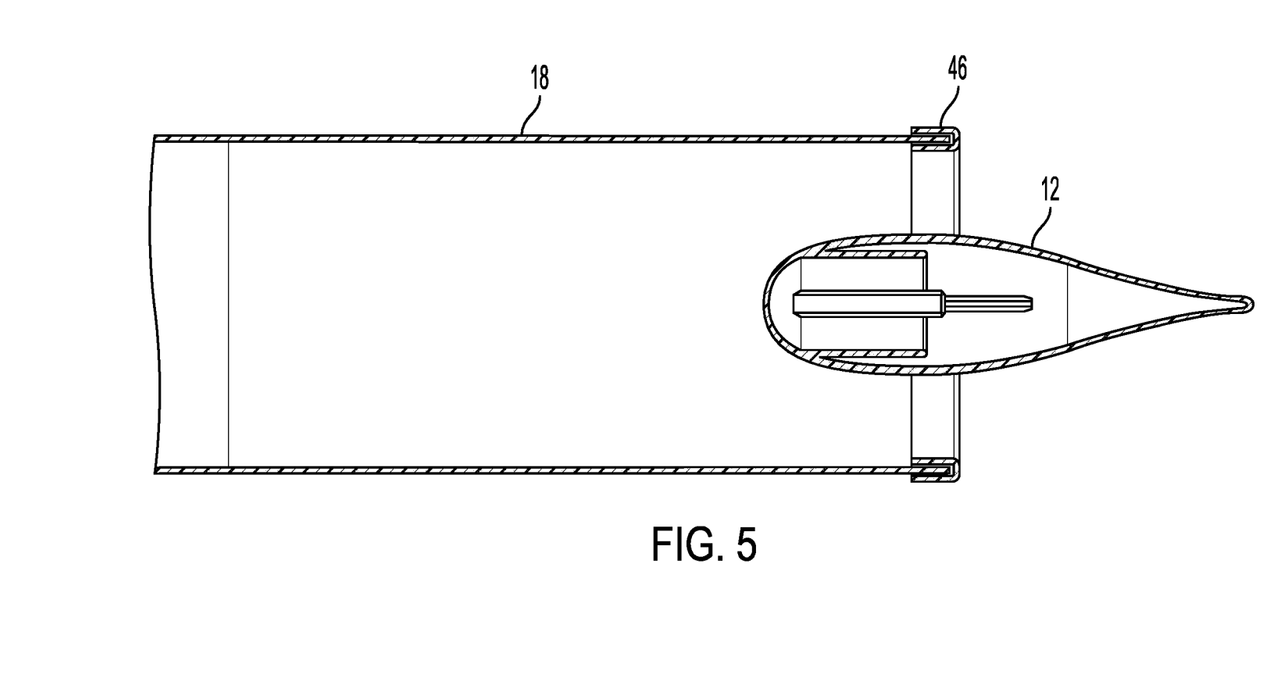
FIG. 5 is a side sectional view at the outlet of the air tube.
Figure 6:
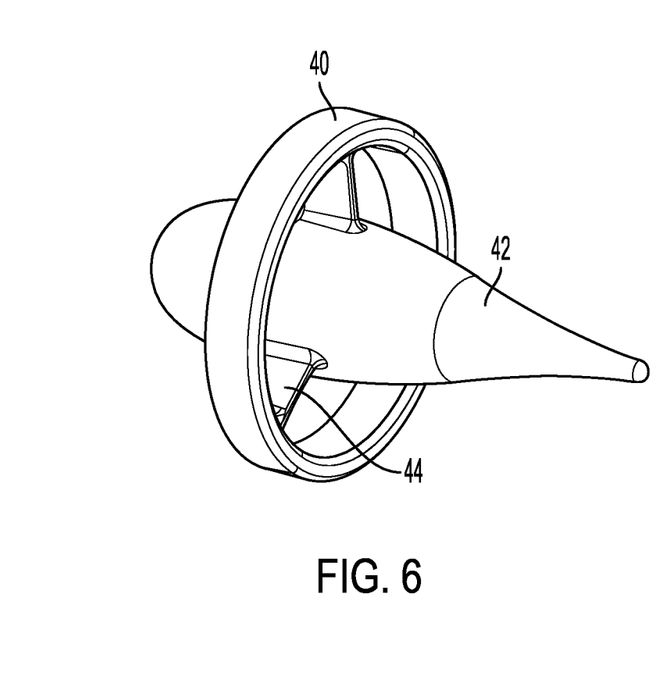
FIG. 6 is a perspective view of the concentrator attachment.
Figure 7:
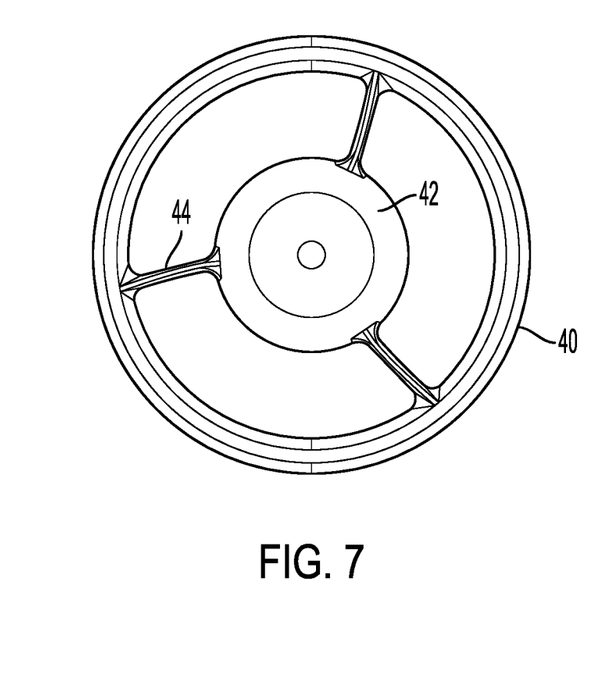
FIG. 7 is a front view of the concentrator attachment.
Figure 9:
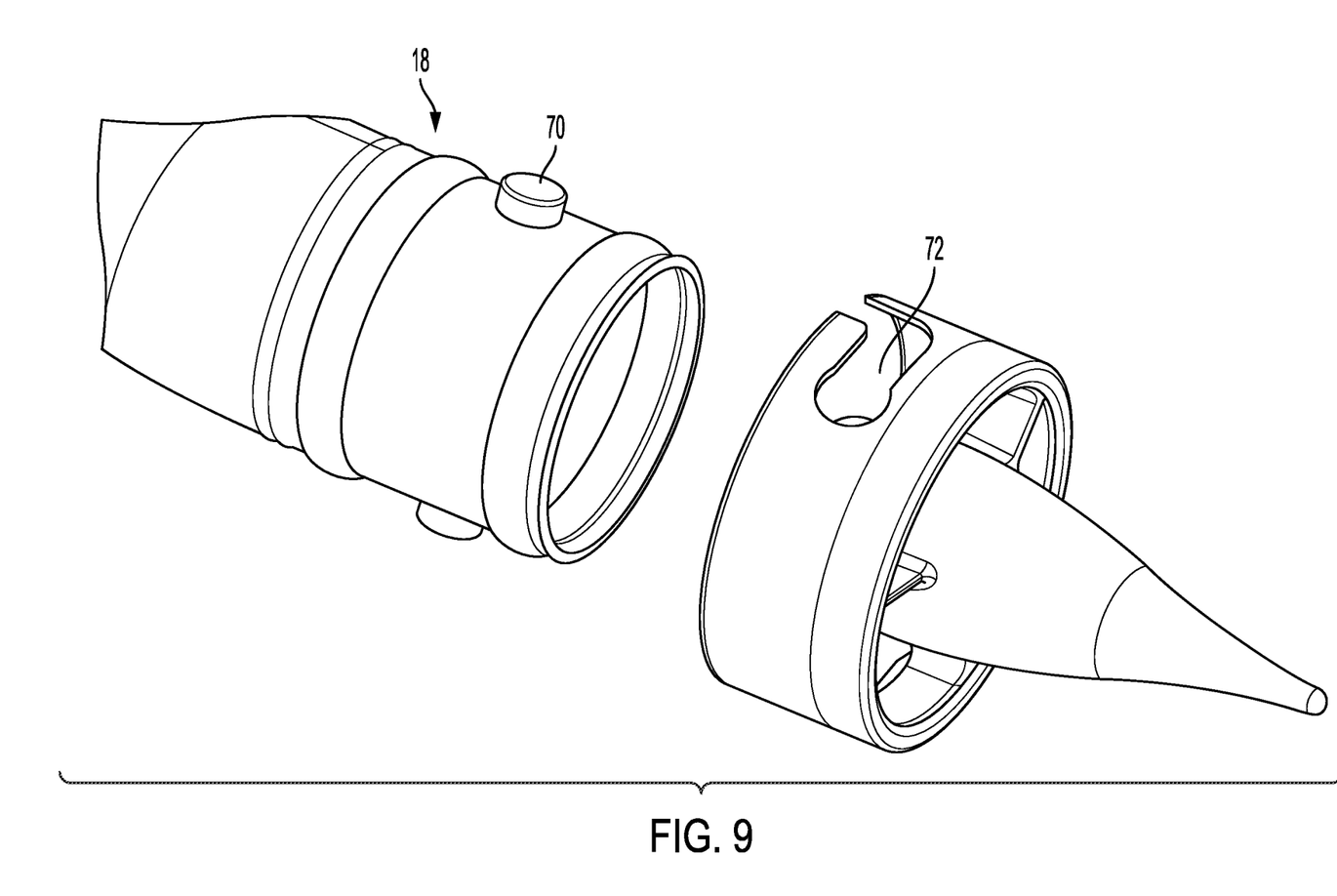
FIG. 9 shows an alternate embodiment of the connection between the concentrator attachment and the air tube.

As shown in FIGS. 5-7, the concentrator 12 includes an outer ring 40 and an inner guide surface 42. The guide surface 42 is connected to the ring by guide vanes 44. As best shown in FIG. 5, the outer ring 40 forms a U-shaped clip or coupling portion 46 that frictionally fits over the end of the air tube 18 to secure it in place. Alternatively, the concentrator 12 can be secured to the air tube 18 using a bayonet style connector as shown in FIG. 9. Here the end of the air tube 18 includes a pin 70. The outer ring of the concentrator includes an L-shaped slot 72 that slides over the pin 70 and is rotated to lock the concentrator to the air tube. The concentrator 12 can also be threadingly connected to the air tube 18 or use any other known connection means.

The vanes 44 are shown in the figures with a slight curve. The vanes 44 can be straight or any other configuration to modify the airflow, and can be used to help reduce turbulence.

The guide surface 42, can be any desired aerodynamic shape, but is shown as tear-drop shaped and is placed at the exit of the air tube 18. As shown in FIG. 5, part of the guide surface 42 is inside the air tube and part of it is outside. The guide surface 42 blocks a center portion of the airflow path so that air is diverted around the guide surface. Because the area of the airflow path area is reduced, the air velocity is increased. However, at the same time, the diameter of the air tube itself is not changed and so its AoE is not affected.

Figure 2:
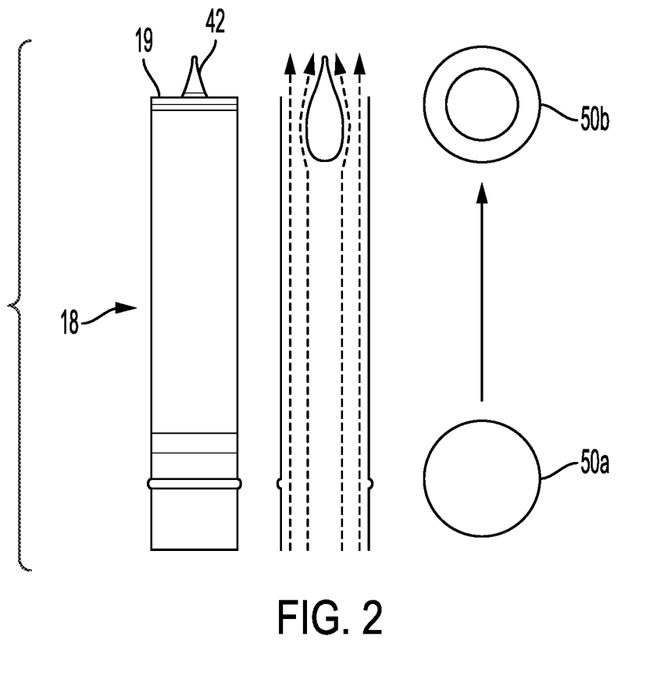
FIG. 2 shows the airflow through an air tube with a concentrator attachment of the present invention.

This effect is best shown by reference to FIGS. 1 and 2. FIG. 1 shows a typical air tube 30 having a concentrator feature built in. The tapered air tube's diameter is reduced so that its exit area and AoE are reduced by 39%, as shown by the cross-sectional area circles at its proximal end 36a and its distal end 36b. Contrast this with FIG. 2, which shows the air tube 18 of the present invention with a concentrator attachment 12 secured at its distal end 19. The diameter of the air tube 18 itself remains constant along its length so that the diameter at its exit 50b is the same as its proximal end 50b. In other words, there is no reduction in the AoE. But because the concentrator's guide surface 42 blocks the airflow at the air tube's exit, the cross-sectional area is reduced by 39% increasing the air velocity at the exit. It should be understood that although the present invention reduces the cross-sectional area by 39%, the guide surface 42 can be sized to reduce the cross-sectional area by more or less than this amount depending on the desired airflow profile.

Furthermore, although the guide surface 42 is shown centered at the exit of the air tube, the guide surface 42 can be off-center or at any position so long as it remains at the exit of the air tube and blocks some portion of the air path.

It should be understood that the concentrator 12 can be used with any air tube, including straight air tubes like in the present invention, or tapered air tubes like that shown in FIG. 1. The use of a concentrator with a tapered air tube would simply alter the existing airflow dynamics in a manner similar to the use of a concentrator with a straight air tube. Furthermore, although the concentrator is shown here as a separate attachment, the principles disclosed here can be integrally formed in an air tube and still fall within the scope of the invention.

Furthermore, it is important to note that the guide surface be positioned at the exit of the air tube 18. This ensures that the air speed upon exiting the air tube is maximized. Having the guide surface placed further upstream may briefly increase the air velocity, but the air velocity would again drop by the time it reached the air tube exit.

Figure 8:
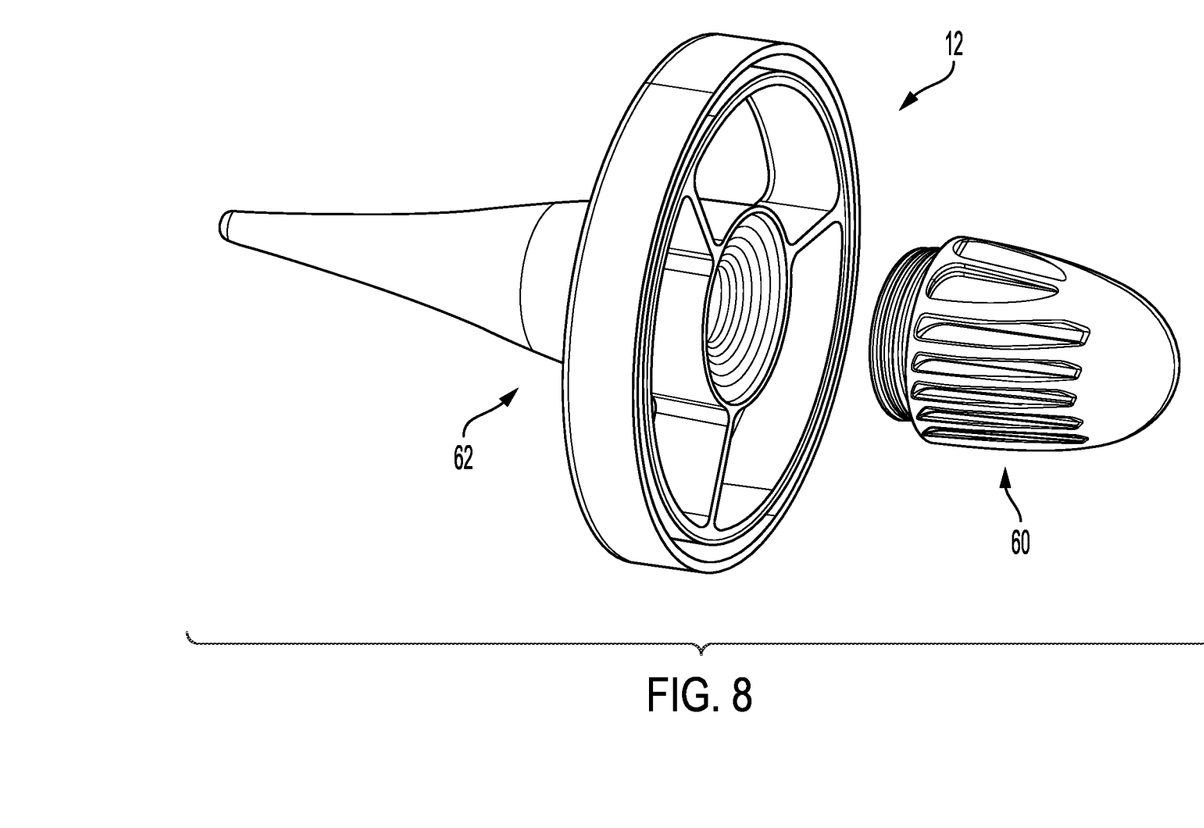
FIG. 8 shows the concentrator attachment in two pieces.

In a preferred embodiment, the concentrator attachment 12 is made of two separate pieces as shown in FIG. 8. A first piece is the head portion 60 which comprises an upstream part of the guide surface and a second piece is a tail portion 62 comprising the ring 40 and a downstream part of the guide surface. The two pieces have threaded connectors that are screwed together to produce the concentrator attachment.

Producing the concentrator attachment from two pieces simplifies manufacturing and assembly. It should be understood that threadingly connecting the two pieces is only one way of connecting the two pieces, and that the two pieces may be connected in any manner, including snap fit, adhesives, etc. Additionally, the concentrator attachment can be made from one piece if desired.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure

The invention claimed is:

1. A blower device comprising:
   a housing;
   an air tube connected to a front portion of the housing, the air tube having an opening at a distal end, wherein the housing encloses a motor and a fan, the motor is operatively connected to the fan, and in operation the fan creates an airflow through the air tube exiting the opening at the distal end of the air tube in an airflow path; and
   a concentrator including an outer ring removably attached to the opening at the distal end of the air tube, an air guide surface positioned centrally of the outer ring, and guide vanes connecting the outer ring to the air guide surface,
   wherein the air guide surface has an enclosed end, the enclosed end of the air guide surface being positioned centrally of the outer ring to block a center portion of the airflow from the air tube and cause the airflow from the air tube to be diverted around the enclosed end of the air guide surface and exit the opening at the distal end of the air tube through a space between the air guide surface and the outer ring of the concentrator.

2. The blower device of claim 1, wherein, when the concentrator is attached to the opening at the distal end of the air tube, the air guide surface of the concentrator is partially inside the air tube and partially outside the air tube.

3. The blower device of claim 1, wherein the distal end of the air tube includes a pin, and the outer ring of the concentrator includes a slot to slide over the pin and be rotated to lock the outer ring of the concentrator to the distal end of the air tube.

4. The blower device of claim 1, wherein the outer ring of the concentrator is formed as a U-shaped clip that frictionally fits over the distal end of the air tube.

5. The blower device of claim 1, wherein a diameter of the air tube is constant from a proximal end to the distal end.

6. A concentrator attachment for a blower device comprising:
   an outer ring to be attached to an opening end of an air tube of the blower device;
   an air guide surface positioned at a center of the outer ring; and
   guide vanes connecting the outer ring to the air guide surface,
   wherein the air guide surface includes an enclosed end, the enclosed end of the air guide surface being positioned at the center of the outer ring to block a center portion of an airflow from the air tube and cause the airflow from the air tube to be diverted around the enclosed end of the air guide surface and exit the opening end of the air tube through a space between the air guide surface and the outer ring of the concentrator attachment.

7. The concentrator attachment of claim 6, wherein the air guide surface has smooth surfaces with no sharp edges.

8. The concentrator attachment of claim 6, wherein the opening end of the air tube includes a pin, and the outer ring of the concentrator attachment includes a slot to slide over the pin and be rotated to lock the outer ring of the concentrator attachment to the opening end of the air tube.

9. The concentrator attachment of claim 6, wherein the outer ring is formed as a U-shaped clip that frictionally fits over the opening end of the air tube.

10. The concentrator attachment of claim 6, wherein, when the concentrator attachment is attached to the air tube, the air guide surface of the concentrator attachment is partially within the air tube and partially outside the air tube.

* * * * *